United States Patent [19]
Abbondanti

[11] 3,909,687
[45] Sept. 30, 1975

[54] FLUX CONTROL SYSTEM FOR CONTROLLED INDUCTION MOTORS

[75] Inventor: Alberto Abbondanti, Pittsburgh, Pa.

[73] Assignee: Westinghouse Electric Corporation, Pittsburgh, Pa.

[22] Filed: Mar. 5, 1974

[21] Appl. No.: 448,315

[52] U.S. Cl. ............... 318/227; 318/230; 318/231
[51] Int. Cl.² ......................................... H02P 5/40
[58] Field of Search .................. 318/227, 230, 231

[56] References Cited
UNITED STATES PATENTS

| | | | |
|---|---|---|---|
| 3,500,158 | 3/1970 | Landau et al. | 318/227 |
| 3,512,067 | 5/1970 | Landau | 318/227 |
| 3,619,749 | 11/1971 | Schieman | 318/227 X |
| 3,718,847 | 2/1973 | Graf et al. | 318/227 |
| 3,775,652 | 11/1973 | Bowler et al. | 318/227 |
| 3,824,437 | 7/1964 | Blaschke | 318/227 X |

*Primary Examiner*—G. Z. Rubinson
*Attorney, Agent, or Firm*—C. M. Lorin

[57] ABSTRACT

An induction motor, supplied by a static converter power supply which is independently adjustable as to frequency and voltage, is voltage controlled so as to keep the flux at an optimum constant level while the frequency is varied and load conditions change substantially. Flux regulation is obtained from a signal processor providing a synthesized representation of the square of the magnetizing current multiplied by the frequency derived from the analog sensing of the supplied voltages and currents. In a negative feedback loop the synthesized signal is compared to a reference signal which is proportional to frequency, and the voltage is controlled therefrom, whereby the magnetizing current developed on the stator of the motor remains constant when frequency varies.

11 Claims, 23 Drawing Figures

FLUX CONTROL SYSTEM FOR CONTROLLED INDUCTION MOTORS

BACKGROUND OF THE INVENTION

The invention relates in general to control of induction motors supplied with variable voltage and variable frequency power and more particularly to such motor control effected under controlled flux conditions.

The flux level in an electrical motor is of major importance in order to insure an optimal utilization of the motor characteristics. In an induction motor, the flux is directly affected by any changes in the voltage or frequency supplied and indirectly by changes in the load level. Control of the torque and speed of an induction motor is dependent upon the frequency and therefore regulation of the frequency is imposed by the motor operating requirements. Control of the flux, on the other hand, depends upon the voltage supplied to the stator of the motor. These two parameters, frequency and voltage, are preferably controlled independently and the modern means employed to this effect are more conveniently static converters like force commutated inverters, or cycloconverters (the latter such as described in the book by B. R. Pelly entitled "Thyristor Phase-Controlled Converters and Cycloconverters," John Wiley Sons, Inc. 1971). If frequency and voltage can be adjusted independently, when control of the frequency and load fluctuations modify the flux condition, it is necessary in order to maintain a desired flux level in an induction motor to provide a special regulation of the voltage. This problem has been recognized by the prior art; however, the solutions are not without difficulties.

The main difficulty encountered has been in obtaining a signal which is representative enough of the flux conditions to control the voltage of the induction motor. One obvious approach is to measure directly the flux across the air gap of the motor. For this purpose the prior art has used flux sensitive devices, such as Hall elements, embedded in the poles of the motor. Another solution of the prior art has been to mount coils on the stator of the motor so coupled that the flux rate of change in the air gap be derived. However, these two approaches require changes in the structure of the motor. This is not desirable when a standard motor is to be used.

Another approach of the prior art is to use as control signal for the voltage a signal related to the frequency and the load level according to some selected function, derived by assuming simplified relationships between frequency, voltage, load and flux, valid within the range of frequency control. An example of this approach is the constant Volt/Hertz control policy. Usually, since this is only an assumption, the range of control under proper flux conditions is too restricted with this approach.

It is an object of the present invention to provide flux control in an induction motor without any of the shortcomings of the prior art.

Another object of the present invention is to provide an improved mode of maintaining a constant flux level in an induction motor supplied with variable voltage and variable frequency power supply.

A further object of the present invention is to provide an improved voltage control system for an induction motor which is frequency controlled under motor operative requirements.

Still another object of the present invention is to improve the mode of operation of an induction motor controlled by a variable voltage and variable frequency electrical supply.

Another and further object of the present invention is to control the flux of an induction motor irrespective of the temperature and charge of the motor.

SUMMARY OF THE INVENTION

The invention resides in an improved system for controlling the flux of an induction motor driven by a polyphase power supply of adjustable frequency and adjustable voltage. Instead of directly measuring the flux as in the prior art, a signal processor is used to combine sensed line voltages and line currents so as to provide a representation of the magnetizing current developed in the stator of the motor. Instead of using a function of the frequency and load to adjust in an open loop manner the voltage function, which in the prior art is only an approximation of true control requirements, the present invention calls for a synthesized signal which represents the flux level resulting from motor operative conditions. Without recourse to any such function of frequency and load, control of the voltage is effected in a closed-loop manner on the basis of the synthesized signal derived in accordance with the present invention. More specifically, in order to adjust the voltage, a negative feedback applies an error signal derived from the synthesized signal by comparison with a reference signal which is proportional to the frequency. The signal processor synthesizes the flux (in the form of $K\omega_1 \times I_M^2$, where $\omega_1$ is the frequency, $I_M$ the magnetizing current, and K a constant) from a derivation of the direct and quadrature voltages and currents of the power supply. The constant K is equal to $L_M(L_M+L_2)/2(L_M+2L_2)$ where, $L_2$ and $L_M$ are the motor inductive constants, $L_2$ for the rotor, $L_M$ for the mutual inductance between stator and rotor. In one particular form of the invention the synthesized signal is a function of the motor phase reactive power, and such reactive power can be derived either by the signal processor itself or through direct measurement.

GENERAL CONSIDERATIONS REGARDING FLUX CONTROL FOR INDUCTION MOTORS

When a multiphase induction motor is fed with a variable frequency multiphase power supply, such as an inverter or a cycloconverter, i.e., a circuit in which both the output frequency $\omega_1$ and the output voltage $V_1$ can be independently adjusted, it is common to seek to maintain the flux of the motor at a level acceptable for given operating conditions. In particular, the flux level is most often kept (as the motor operating conditions i.e., the speed and the torque vary) at a value which is close to the nominal value, e.g., the flux level attained when the motor operates at nameplate frequency with nameplate voltage and zero load. This is referred to as the constant flux mode of operation. This mode of operation ensures the highest possible torque per ampere of stator current and therefore it results in the best possible utilization of the current available for the drive. Constant flux operation is also favorable with regard to the motor response parameters, since otherwise these parameters might vary widely when the speed or load change, with undesirable effects on the drive stability, in particular with high performance servo drives. Although strategies of flux control other than the constant flux mode are conceivable, the constant flux mode of operation will be considered primarily as a typical illustration of the flux regulation requirements in induction motor drives.

When a motor is operated at constant flux, the two controllable output quantities of the supply, namely $\omega_1$ and $V_1$, will have to be adjusted, for each particular operating condition, in order to ensure the desired flux level. Actually $\omega_1$ is closely related to the shaft speed and is, therefore, imposed by the motor speed requirements. Therefore, the only parameter independently available for flux regulation is $V_1$.

Figure 1:
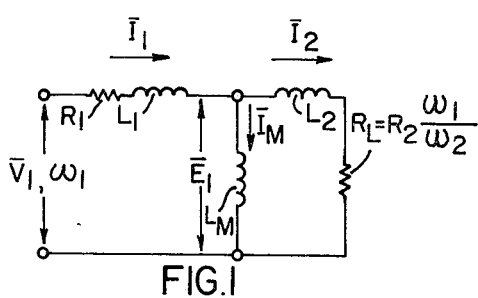
FIG. 1 shows the equivalent circuit of an induction motor.

Considering the motor equivalent circuit of FIG. 1, it appears that for a given operating condition defined by a frequency $\omega_1$ and a load (i.e., a stator current) $I_1$, the machine flux level (i.e., the magnitude of the magnetizing current $I_M$) is determined by the value of $V_1$. If a given flux is desired, a value of $V_1$ should be used, such that when the drop $I_1(R_1 + j\omega_1L_1)$ is subtracted from it, the resulting "air gap voltage" $E_1$ fulfills the relation $E_1 = j\omega_1L_1I_M$ where $I_M$ is the nominal magnetizing current corresponding to the desired value of the flux, and $L_1$ is the inductance of the stator.

If $V_1$ has been adjusted to the desired magnitude for the considered operating condition and assuming that the load undergoes a variation (i.e., that $I_1$ varies) without variation of $\omega_1$, it is seen that on account of the variation of the drop across $R_1$ and $\omega_1L_1$, $E_1$ will also vary. In order to restore $E_1$ at the desired value, i.e., to ensure constant flux operation, $V_1$ should be varied. Similarly, if we assume a variation of the operating conditions such that $\omega_1$ and only $\omega_1$ varies, it is seen that the constancy of the flux requires that $E_1$ and, therefore $V_1$, be varied in response to the change in frequency.

It appears thus that a precise relation between the voltage $V_1$, the frequency $\omega_1$ and the stator current $I_1$ exists which must be respected for flux control.

Figure 2:
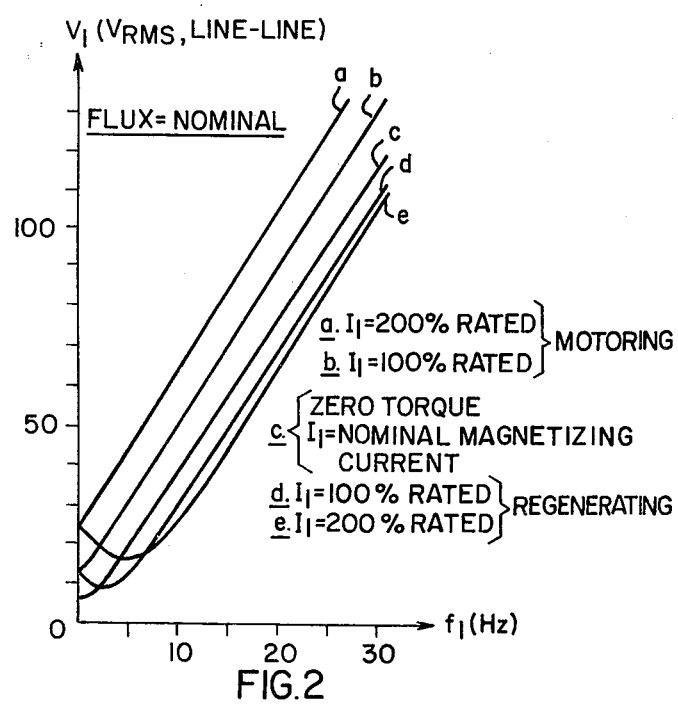
FIG. 2 illustrates by a family of curves the relation between stator voltage, stator frequency and load level required to achieve the constant flux condition in a typical induction motor.

The exact relation between $V_1$, $\omega_1$, and $I_1$, fulfilling the condition of constant flux can be derived from the equivalent diagram of FIG. 1 and can be expressed by a family of curves such as shown on FIG. 2 for a typical motor. These curves call for the following considerations when controlling $V_1$: The voltage should generally increase with frequency in close to linear fashion, except for regenerative operation at low frequency. For a given frequency, the voltage should increase when motoring load is applied and it should decrease (except at low frequency) when regenerative load is applied. The amount of voltage increase when motoring at fixed frequency should roughly be proportional to load while being fairly independent from the operating frequency. In the regenerating mode, the required amount of voltage variation is related to the load but not proportionally. In such case the required voltage variation is fairly constant with respect to load variations when the frequency is high, but it becomes a more pronounced function of the load level in the low range of frequency. At relatively high frequency, when a voltage decrease under regenerative load is required, such decrease should always be smaller than the corresponding increase required to handle the same load in motoring conditions. It is finally observed that the voltage change required for a given regenerative load must change sign below a given frequency which is not the same for each load level.

The key to a solution to the problems encountered when controlling a drive in the constant flux mode is to implement, in the mechanism that regulates $V_1$, a proper dependence between $V_1$ on the one hand, and $\omega_1$ and $I_1$, on the other hand, so as to approximate as much as possible the ideal relation between these parameters.

DESCRIPTION OF THE PRIOR ART

Several approaches have been used in order to vary $V_t$ as a function of the frequency and load in a way which would somewhat approximate the ideal one required for constant flux operation.

Figure 3:
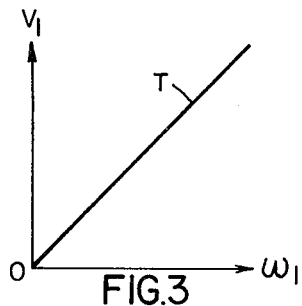
FIG. 3 shows a linear voltage-frequency characteristic which approximates a constant flux mode of operation.
Figure 4:
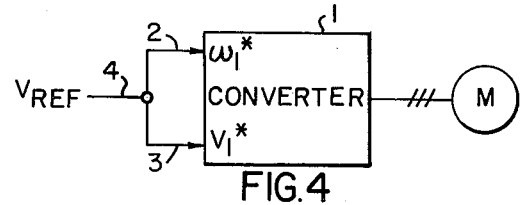
FIG. 4 shows schematically a circuit suitable to achieve control as indicated by FIG. 3.

A common way of controlling induction motors consists in systematically ignoring the motor drop due to the equivalent resistance $R_1$ and the equivalent inductance of the stator (see FIG. 1). With this approximation, the flux resulting from the application of a given voltage $V_1$ can be regarded as independent from load and as depending only upon $\omega_1$. In such case, constant flux operation is obtained simply by keeping the amplitude of $V_1$ strictly proportional to $\omega_1$ (see curve T, FIG. 3). This could be accomplished, for instance, by using one signal, both as the frequency reference $\omega_1$ and as the voltage reference $V_1$, for controlling the converter 1 (FIG. 4).

Figure 5:
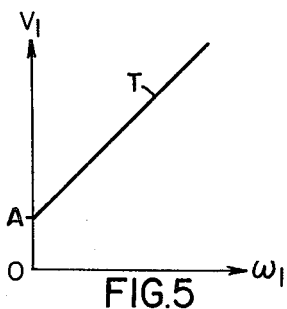
FIGS. 5 and 6 respectively set forth another type of linear control characteristic and a suitable control circuit of the prior art.
Figure 6:
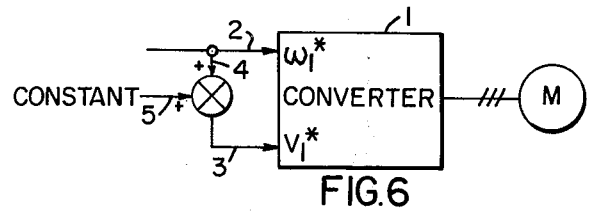

For relatively high frequencies this approach is valid and leads only to a moderate underexcitation with motoring of the drive, while overexcitation with regenerative loads, is not excessive. However, for the low frequency range the neglected stator resistive drop becomes so important compared to $V_1$ that it can no longer be ignored without a severe underexcitation and a loss of torque capability. To correct this deficiency, the prior art suggests to use a characteristic for $V_1$ that can be programmed to follow a law other than proportional. For instance, it has been suggested to deliberately accept a zero load overexcitation of the machine through the use of a shifted linear relationship such as shown on FIG. 5. FIG. 6 shows a control circuit in accordance with the curve of FIG. 5. Here the control signal for the voltage on line 3 can never be smaller than the constant value imposed on line 5. Above the level so defined which corresponds to point A of curve (T) of FIG. 5, voltage control of the inverter 1 becomes linear along T and the circuit of FIG. 6 operates as the circuit of FIG. 4.

Figure 7:
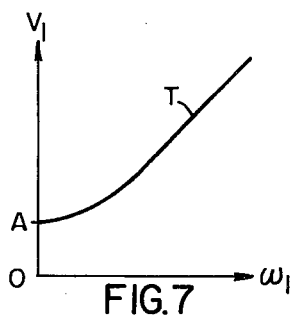
FIGS. 7 and 8 respectively represent by analogy to FIGS. 3 and 4, or FIGS. 5 and 6, a control characteristic and the corresponding prior art control circuit for another mode of control approximating the ideal voltage-frequency characteristic for constant flux operation.
Figure 8:
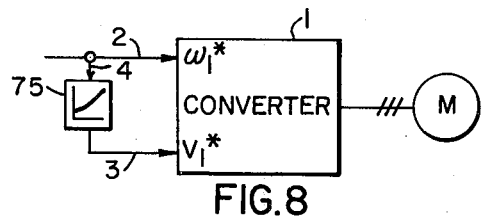

Another solution consists of "boosting" the voltage at low frequency only, as indicated by FIGS. 7 and 8. These two approaches may be combined. These techniques permit reaching high torques at low speed. However, when the motor is not loaded, the machine is overexcited, since the boost is still present and it becomes heavily saturated, particularly at low frequency. Saturation causes problems due to motor heating, and high pitch acoustical noise (especially in PWM inverter drives). At low frequency, the steady state no-load current is comparable in magnitude to the peak overload current which is required from the drive. The result is motor overheating.

Figure 9:
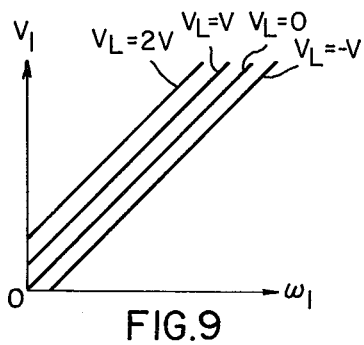
FIG. 9 provides a family of curves corresponding to linear control achieved when taking into account the voltage drop across the stator of the motor.

Another prior art approach is to provide a compensation for the stator drop, $R_1 I_1$. This technique is based on the recognition that, for a fixed $V_1$ and at a fixed frequency, the flux decreases with increasing motoring load because of the increasing voltage drop across the stator resistance $R_1$, due to the stator current $I_1$. In order to neutralize the effect of the drop, it has been suggested to increase the voltage $V_1$ in proportion to a load dependent parameter $V_L$. FIG. 9 shows a family of curves which differ by the value of this load parameter. $V_L$ can conceivably be derived in several alternate ways.

Figure 10:
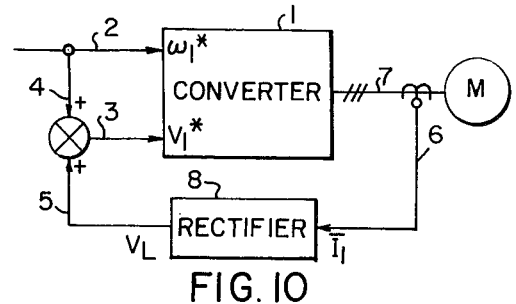
FIGS. 10, 11 and 12 are three prior art control circuits for achieving linear control as shown on FIG. 9.

According to one approach that can be called "current-dependent boost", $V_L$ is obtained by full-wave rectification of the stator current. Here, $V_L = k|I_1|$. This is implemented as shown on FIG. 10. The control signal $V_L$ is derived at 5 after rectification at 8 of the sensed value $\bar{I}_1$. $\bar{I}_1$ is obtained by sensing the current of the multiphase supply 7 to the motor M. The circuit for controlling the converter 1 in terms of $\omega_1$ and $V_1$ in response to the control signal so derived is similar to the circuits of FIGS. 4, or 6. In this case, the compensation has only one polarity, which is generally chosen to suit motoring loads and is therefore the wrong one for regenerative load. However, this may be sometimes acceptable, because if this solution can result in saturation, it never causes underexcitation of the machine, and the torque generating capability is preserved.

The "current-dependent boost" technique somewhat reduces the saturation of the machine at zero load and low frequency, as compared to the previously mentioned approach. However, the saturation effect, with its adverse consequences, is by no means suppressed, since this solution fails to account for the $V_1$, $I_1$ phase relationship and therefore the no-load magnetizing current is treated as if it were a normal load current, so that a substantial voltage boost is provided even at zero load.

Figure 11:
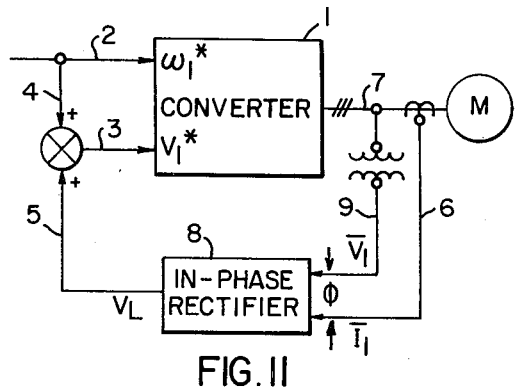

There is a solution to the problem which can be called "in-phase current-dependent boost." The idea here is to obtain $V_L$ by phase sensitive rectification of $I_1$, using $V_1$ as a phase reference. The relation followed is $V_L = kI_1 \cos \omega_1$. The implementation of this solution is shown on FIG. 11. An in-phase rectifier 8 is provided responsive to sensed current $I_1$ and sensed voltage $V_1$ (received on lines 6 and 9, respectively) and the output provides on line 5 the load parameter $V_L$. Otherwise, the arrangement is similar to the circuit of FIG. 10. Here, the load parameter $V_L$ automatically changes sign when the load changes from motoring to regenerating. At high frequencies a better approximation of the ideal law of voltage variation is obtained although the effected compensation remains inaccurate in magnitude, if not in sign. At low frequency, the technique fails to properly handle the regenerative loads. Saturation at zero load and low frequencies is reduced but it still exists because the technique fails to vectorially compensate for the stator drop, $I_1 R_1$.

It has been found that the two above-mentioned "current-dependent boost" approaches result in a control response exhibiting poor stability characteristics when an attempt is made to compensate close to 100 percent.

Figure 12:
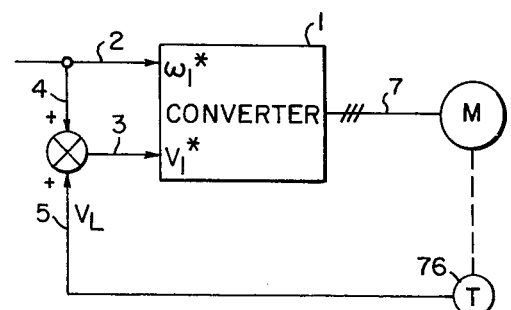

A third approach is by "slip-dependent boost." In this case the load parameter $V_L$ is obtained from an analog slip frequency signal, since $V_L = k\omega_2$, where $\omega_2$ is the frequency of the rotor. The control, which is in accordance with the family of curves of FIG. 9, is in its most simple implementation, as shown on FIG. 12. A tachometer 6 provides the control signal. Here the compensation assumes either sign as required (except for low frequencies) and no saturation problem exists at zero load. The stability is good even at 100 percent compensation. However, this technique requires the use of a slip transducer 76 (FIG. 12) to deliver on line 5 a speed signal which, subtracted from the analog frequency reference signal derived from line 4, provides the slip. When a tachometer is not needed for speed regulation purposes, the use of a tachometer only for flux control makes the solution expensive. This solution is also often impractical for mechanical reasons, since a high degree of accuracy and a low level of ripple are required from such a tachometer. Other, more sophisticated, types of rotary slip transducers are conceivable, but they would be impractical for industrial drives. The fact remains that this technique generally fails to provide the proper compensation when the load is regenerating at low speed.

A more direct approach to the problem is to use closed-loop flux regulation. It is known to sense the flux $\phi$, or a quantity related to it, and to compare the sensed value to a reference in order to vary the voltage in response thereto so as to nullify the error. The flux achieved is at the desired level in any situation. The resulting characteristics $V_1 = f(\omega_1, I_1)$ are no longer mere approximations of the ideal curves. They are rather exact duplicates of the curves of FIG. 2. As a result many of the drawbacks of the above described prior art solutions are avoided.

However, sensing of the flux requires that flux sensitive devices such as Hall elements be imbedded in the motor poles in order to provide a flux signal. This is costly and impractical, due to the structural changes made on the motor itself and for that reason the use of any standard motors available from the shelf would be excluded.

DESCRIPTION OF THE INVENTION

While it is desirable to control the voltage as a function of the flux, any direct sensing on the poles or in the air gap is to be avoided. The present invention resides in deriving the control signal from a synthesization of a certain function of the flux by a signal processor responsive to signals derived from sensing the actual line voltage and currents supplied to the motor under control.

Figure 13:
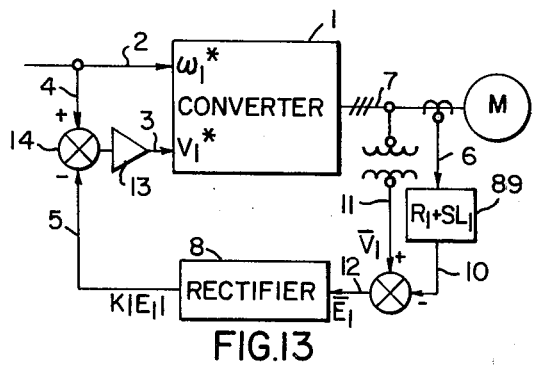
FIG. 13 shows a prior art mode of controlling the flux in response to the sensed flux rate of change.

One function of the flux which can be used is the rate of change of the flux, which is represented by the air gap voltage $E_1$. $E_1$ can be synthesized from $V_1$ if the magnitude of the stator drops $R_1 I_1$ and $\omega_1 L_1 I_1$ are known. Since $R_1$ and $L_1$ are well defined parameters of the motor and $I_1$ is measurable, the synthesis of $E_1$ is possible by performing operations on the instantaneous values of the motor voltage and current as indicated on FIG. 13. The synthesized air gap voltage $E_1$ is rectified at 8 and the DC signal representing its magnitude is regulated via line 5 through a feedback loop (12, 5, 3), so as to be proportional to the operating frequency $\omega_1$ received from line 4. An amplifier 13 is inserted to this effect in line 3 after the summing point 14.

This approach duplicates almost prefectly the characteristics of FIG. 2. It has the disadvantage, however, of relying on the constancy of $R_1$. Unfortunately, $R_1$ varies substantially with temperature, and the effected compensation which is valid at room temperature becomes inadequate, especially at low frequency, when the motor is warm. This effect may be neutralized by probing the motor temperature or by other methods providing an indirect monitoring of $R_1$ during operation.

Nevertheless, a preferred form of the present invention consists in using a signal more directly related to the flux level. Such signal, according to the present invention, is synthesized from the information available on the motor terminals, e.g., the voltages and motor line currents and signal processing is accomplished on these quantities without the need to know the stator resistance $R_1$, which can, therefore, vary with temperature with no bearing on the derivation of the flux level.

A flux related signal used to obtain information on the level of the flux, according to the present invention, is a signal representing what is known as the motor phase "reactive power" $W_x$. If the motor is supplied with a sinusoidal voltage $V_1 = V_1 \sin \omega_1 t$, resulting in the flow of a sinusoidal current $I_1 = I_1 \sin(\omega_1 t - \phi)$, the reactive power in one phase is defined as:

$$W_x = \tfrac{1}{2} V_1 I_1 \sin \phi.$$

This is the power delivered to a resistive system which, when energized by a source $\overline{V_1}$, would draw from this source a current, the magnitude of which is equal to the magnitude of the motor reactive current $I_1 \sin \phi$.

It is possible, according to the present invention, to derive a measure of $W_x$ from $V_1$ and $I_1$ by classical wattmetric methods. Other modes of derivation according to the invention will be suggested or described hereinafter.

The basic concept of the proposed flux regulation method rests upon the recognition that $W_x$ is a function of, and only of: a) the magnetizing current $I_M$ (and therefore of the flux $\phi$), b) the line current $I_1$, c) the motor inductive parameters $L_1$, $L_M$, $L_2$, d) the frequency $\omega_1$. As will be established hereinafter, this function is expressed by the following equation:

$$W_x = \frac{1}{2(L_M+2L_2)}\left[(L_M^2+L_M L_2)I_M^2+(L_M L_2+L_M L_1+2L_1 L_2)I_1^2\right] \quad (1)$$

where the parameters are as defined hereabove by reference to the equivalent circuit of FIG. 1.

Since $\omega_1$ and the inductive parameters are known, and $I_1$ and $W_x$ can be measured, it appears that from equation (1) $I_M$, and therefore $\phi$, can be derived by a proper processing of these known and measured elements. For instance, equation (1) can be modified to read as follows:

$$\frac{L_M(L_M+L_2)}{2(L_M+2L_2)}\omega_1 I_M^2 = W_x - \tfrac{1}{2}\omega_1 I_1^2\left[L_1+\left(\frac{L_M L_2}{L_M+2L_2}\right)\right] \quad (2)$$

Considering equation (2) it appears from the left side of the equation that the two terms on the right side (which terms can be known, or processed, from data available by analog sensing) could be used to derive a control signal which is a function of the magnetizing current, e.g., of the flux $\phi$. Signal processing would involve $V_1$, $I_1$ as inputs and the circuit parameters would be scaled to reflect the motor inductive constants $L_M$, $L_1$ and $L_2$. It also appears from equation (2) that if the output of the signal processor is regulated so as to remain strictly proportional to the frequency $\omega_1$, the constant of proportionality will be $L_M(L_M+L_2)/2(L_M+2L_2) \times I_M^2$, and therefore $I_M^2$ will have been in fact maintained constant. Therefore, this method of voltage regulation provides a constant flux for the motor when $\omega_1$ is varied or, when $I_1$ varies as a consequence of load changes.

Figure 14:
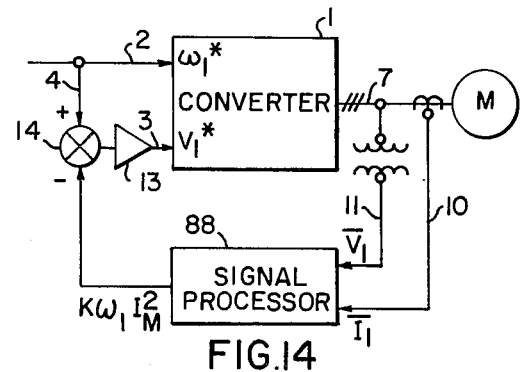
FIG. 14 illustrates conceptually the mode of control by a signal synthesizing the flux derived in accordance with the present invention.

Referring to FIG. 14, a circuit is shown for deriving a control signal as represented by the left side of equation (2), namely, $K.\omega_1.I_M^2$. From the output of the converter 1 power is supplied to the motor over multiphase terminals 7 from which $\overline{V}_1$ and $\overline{I}_1$ are derived via lines 11 and 10, respectively. A signal processor 88 combines this analog information so as to obtain the algebraic sum of the two terms on the right side of equation (2). To this effect, the reactive power $W_X$ can be derived independently by actual measuring as hereabove explained, or by computation, and combined with the other term in the processor. The two terms can also be computed, without any separate derivation or computation of $W_X$ as will be explained hereinafter. The resulting output of signal processor 88 represents $K.\omega_1.I_M^2$.

Since the signal on line 5 is proportional to $\omega_1$, one must supply to line 4 a signal which also is proportional to $\omega_1$, and a comparator 14 provides a signal error which is amplified by amplifier 13 to derive the voltage control signal on line 3. $V_1$ is varied in response to the error signal so as to nullify the error. Therefore, $V_1$ in fact keeps $I_M^2$ constant, and therefore the flux $\phi$ is maintained constant.

It is possible to design the feedback loop (11, 10, 5, 13, 3) so as to obtain the proper level of flux for which $V_1$ is to be adjusted.

Referring to FIGS. 15 through 20, it will be shown now how the phase reactive power $W_X$ of the motor can be processed by a signal processor from sensed values of the motor voltages and currents.

Considering the motor equivalent circuit of FIG. 1, and the vector diagram of FIG. 15, it is easily seen that $W_X = \frac{1}{2} V_1 I_1 \sin \phi$ can also be formulated as follows:

$$W_X = \tfrac{1}{2}\omega_1 L_1 I_1^2 + \tfrac{1}{2}\omega_1 L_2 I_2^2 + \tfrac{1}{2}\omega_1 L_M I_M^2 \quad (3)$$

where the motor inductive constants are as previously defined. All these terms have the form $\frac{1}{2}\omega L I^2$, and therefore they each represent a reactive power developed in an inductor L by an ac current I having a frequency $\omega$. Thus, equation (3) in fact states that the total reactive power developed in one phase of the motor is the sum of the respective reactive powers developed in all the motor reactive components. The resistive components of the motor are of no moment for the formulation of $W_X$.

Figure 15:
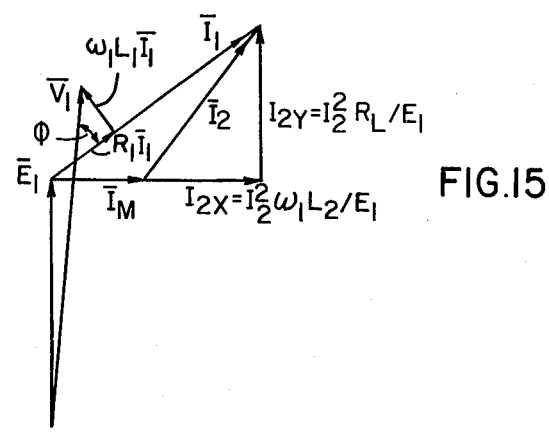
FIG. 15 is a vectorial representation explaining how to derive the motor phase reactive power used for control in accordance with the present invention.

Equation (3) also shows that the magnetizing current $I_M$ is related to $W_X$ by a stator current dependent term and a rotor current dependent term. The first term is known since we can measure $I_1$. The second term is not readily available. However, the relation binding $\overline{I}_1$, $\overline{I}_M$ and $\overline{I}_2$ is such that the term $I_2^2$ can be eliminated from equation (3) when proceeding as follows:

From FIG. 15 it appears that:

$$I_1^2 = (I_M + I_{2X}2 + I_{2X}^2 = I_M^2 + 2I_M I_{2X} + I_2^2$$

where $$I_{2X} = I_2^2 \, \omega_1 L_2 / E_1 \text{ and } I_M = E_1/\omega_1 L_M$$

Therefore:

$$I_1^2 = I_M^2 + 2I_2^2 \frac{L_2}{L_M} + I_2^2 \quad \text{or}$$

$$I_1^2 - I_M^2 = \frac{L_M + 2L_2}{L_M} I_2^2 \quad (4)$$

Replacing $I_2^2$ in equation (3) by $I_2^2$ as derived from the expression given in equation (4) (e.g., a function of $(I_1^2 - I_M^2)$), leads to the following equation.

$$2W_X = \omega_1 L_M \frac{L_M + L_2}{L_M + 2L_2} I_M^2 + \omega_1 \frac{L_M L_2}{L_M + 2L_2} I_1^2 + \omega_1 L_1 I_1^2 \quad (5)$$

which is identical to equation (1). The conclusion is that $W_X$ can be fully defined without the knowledge of $\overline{I}_2$.

Figure 16:
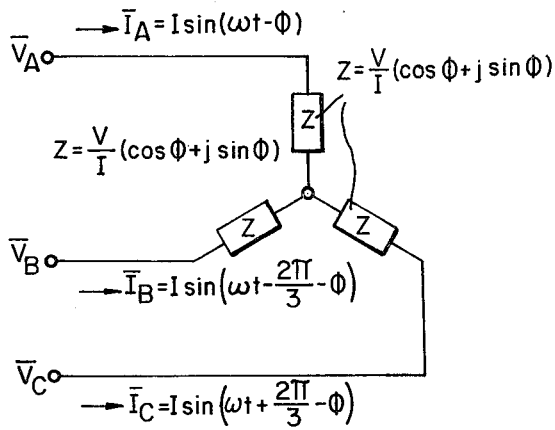
FIG. 16 shows the three phases of an induction motor in a Y arrangement.
Figure 17:
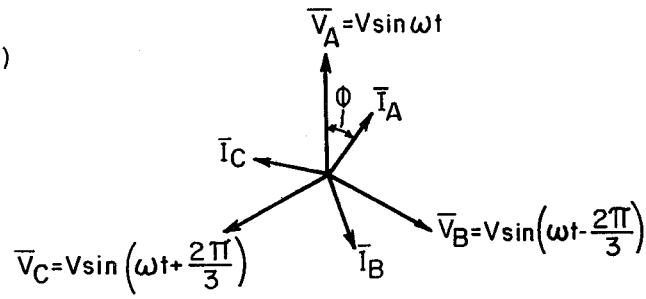
FIG. 17 is a vectorial representation of the currents and voltages of the diagram of FIG. 16.

Consideration should be had now to the balanced 3-phase system shown in FIG. 16 and to the vectorial diagram of FIG. 17. In order to simplify the adjunct circuitry, and as described below, the 3-phase system of FIG. 17 will now be resolved into an equivalent 2-phase system having component vectors of equal magnitude and at right angle to each other, as shown on FIG. 18 for the voltage vectors, on FIG. 19 for the current vectors, which vectors are for convenience hereinafter called: the "direct" component, for $\overline{V}_d$ and $\overline{I}_d$, and the "quadrature" component, for $\overline{V}_q$ and $\overline{I}_q$. A vectorial transformation by reference to the direct and quadrature vectors will now be effected as shown on FIGS. 18 and 19 for the voltage and the currents, respectively. Thus, an equivalent system of voltages $\overline{V}_d$, $\overline{V}_q$ and $\overline{I}_d$, $\overline{I}_q$ is derived in which the voltages and currents are of equal amplitude and in quadrature to each other.

The product $\overline{V}_d \overline{I}_q$ may be expressed trigonometrically as follows:

$$\overline{V}_d \overline{I}_q = -VI \sin \omega t (\cos \omega t - \phi) = -VI/2 \sin \phi \, (2\omega t - \phi). \quad (6)$$

Equation (6) contains a DC term $VI/2 \sin \phi$ which is precisely equal to the reactive power $W_X$ supplied to one phase of the system. However, equation (6) also contains an AC term of amplitude $VI/2$ and exhibiting twice the frequency of the applied voltages.

Similarly, the product $\overline{V}_q \overline{I}_d$ may be expressed as follows:

$$\overline{V}_q \overline{I}_d = -VI \cos \omega t (\sin \omega t - \phi) = VI/2 \sin \phi - VI/2 \sin (2\omega t - \phi) \quad (7)$$

Equation (7) also contains $VI/2 \sin \phi$ as a DC term, and an AC term exhibiting twice the frequency of the applied voltages. It is observed that the AC term of equation (6) has the same amplitude and phase as the AC term of equation (7), while the DC terms in these two equations are of opposite signs. Therefore, the difference between the products is equal to twice the DC component, since the AC components are cancelling out. This is expressed as follows:

$$\overline{V}_q \overline{I}_d - \overline{V}_d \overline{I}_q = VI \sin \phi = 2 W_X \quad (8)$$

Figure 20:
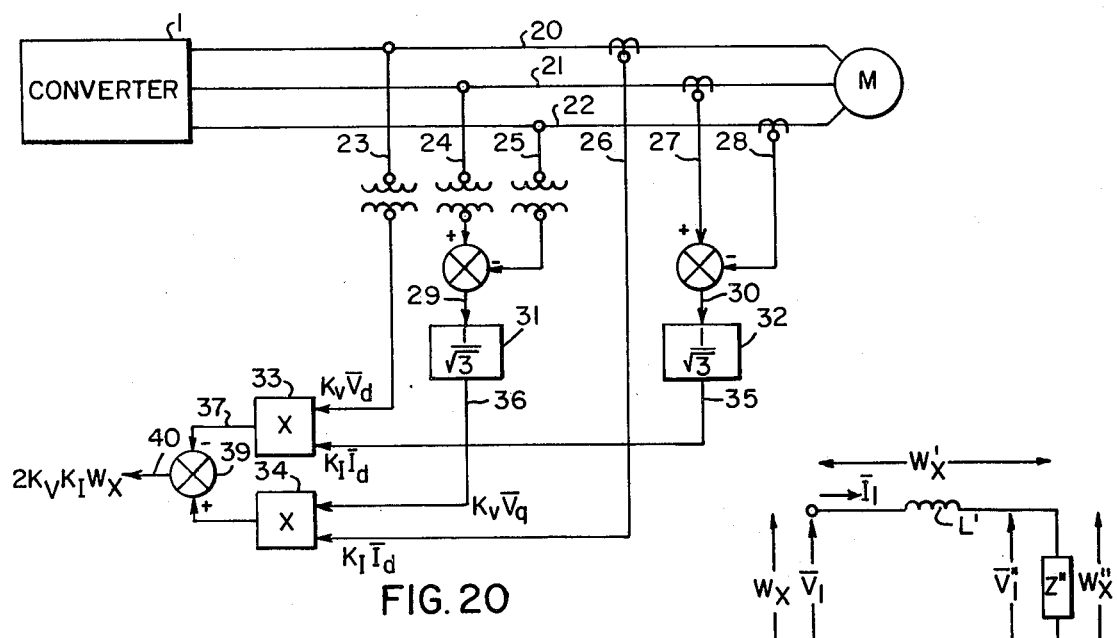
FIG. 20 is a control circuit according to the invention which can be used in order to derive a signal representative of the motor phase reactive power.

FIG. 20 provides a schematic representation of a circuit for the implementation of equation (8).

Figure 18:
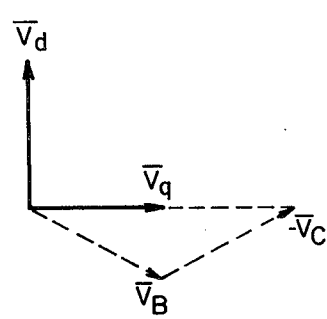
FIG. 18 shows vectorially how the quadrature and direct voltages are related to the terminal voltages of the motor.
Figure 19:
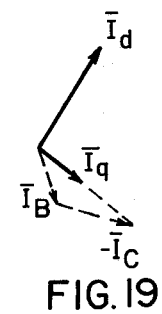
FIG. 19 shows vectorially how the quadrature and direct currents are related to the line currents of the motor.

Converter 1 is supplying power to an induction motor M through three phase lines 20, 21, 23 from which the phase currents are sensed, on respective lines 23, 24, 25, and the phase voltages are sensed on respective lines 26, 27, 28. The three phases of the motor are assumed to be in a Y configuration. Referring to FIGS. 18 and 19, the following expressions of the direct and quadrature voltages $\overline{V}_d$, $\overline{V}_q$, and of the direct and quadrature currents, $\overline{I}_d$, $\overline{I}_q$ obtain as follows:

$$\overline{V}_d = \overline{V}_A = V\sin \omega t \qquad (9)$$

$$\overline{V}_q = 1/\sqrt{3}\ (\overline{V}_B - \overline{V}_C) = -V\cos \omega t \qquad (10)$$

$$\overline{I}_d = \overline{I}_A = I\sin (\omega t - \phi) \qquad (11)$$

$$\overline{I}_q = 1/\sqrt{3}\ (\overline{I}_B - \overline{I}_C) = -I\cos (\omega t - \phi) \qquad (12)$$

where $V_A$, $V_B$, $V_C$, $I_A$, $I_B$, $I_C$ are the phase voltages and currents.

Referring to FIG. 20, line 46 supplies $K_v\overline{V}_d$ directly from line 23 and phase A (line 20) in accordance with the first of the last four relations. From the two phases B, C, lines 24, 25 provide signal representations of the phase voltages $V_B$, $V_C$ which are subtracted by a summer, the output of which is supplied to an amplifier having a gain of $1/\sqrt{3}$. Therefore, on line 36, a signal characteristic of $K_v\overline{V}_q$ is obtained in accordance with the second of the last four equations. Similarly, $K_I I_d$ and $K_I I_q$ are provided on lines 26 and 35 in accordance with the two last equations, respectively. From two multipliers 33 and 34 are derived the products $\overline{V}_d \overline{I}_q$ and $\overline{V}_q \overline{I}_d$, respectively, and the two multiplier outputs 37, 38 are again combined by a summer 39 in order to provide on a common output line 5, a control signal which is an expression of $2K_V K_I W_X$, e.g., of the motor phase reactive power.

From the above, it appears that $W_X$ can be either measured, or obtained by signal processing.

Figure 21:
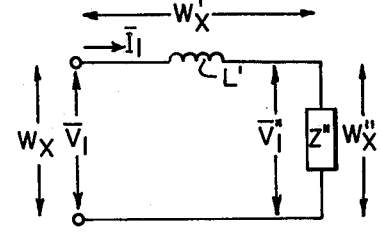
FIG. 21 shows an equivalent circuit to indicate how the motor phase reactive power must be in fact corrected in order to obtain a representation of the magnetizing current.

Equation (2) proves that, knowing $W_X$, a second term $W_X'$ equal to $\frac{1}{2} \omega_1 I_1^2 (L_1 + L_M L_2/L_M + 2L_2)$ must be known in order to fully satisfy the expression $K \omega_1 I_M^2$ to be used for control purpose, as previously explained by reference to FIG. 14. This second term can be separately calculated by analog circuitry since $I_1$ and the motor constants are known. Preferably, one can directly account for this second term in the reactive power calculator by using the following approach:

Considering FIG. 21, the motor equivalent circuit of FIG. 1 can be replaced by another equivalent circuit which for the same input voltage $V_1$ has an equivalent impedance $Z''$ such that the input current $I_1$ has the same amplitude and phase as in FIG. 1. The input reactive power $W_X$ would be the same as before. If we write the right side of equation (2) as being the difference $X_X - X_X'$, where $W_X' = \frac{1}{2}\omega_1 I_1^2 (L_1 + L_M L_2/L_M + 2L_2)$, then $W'$ represents the reactive power developed in a series inductance $L'$ and the reactive power across $Z''$ would be $W_X'' = W_X - W_X''$ which is the expression of the left side of equation (2), e.g., $W_X'' = K\omega_1 I_M^2$.

Figure 22:
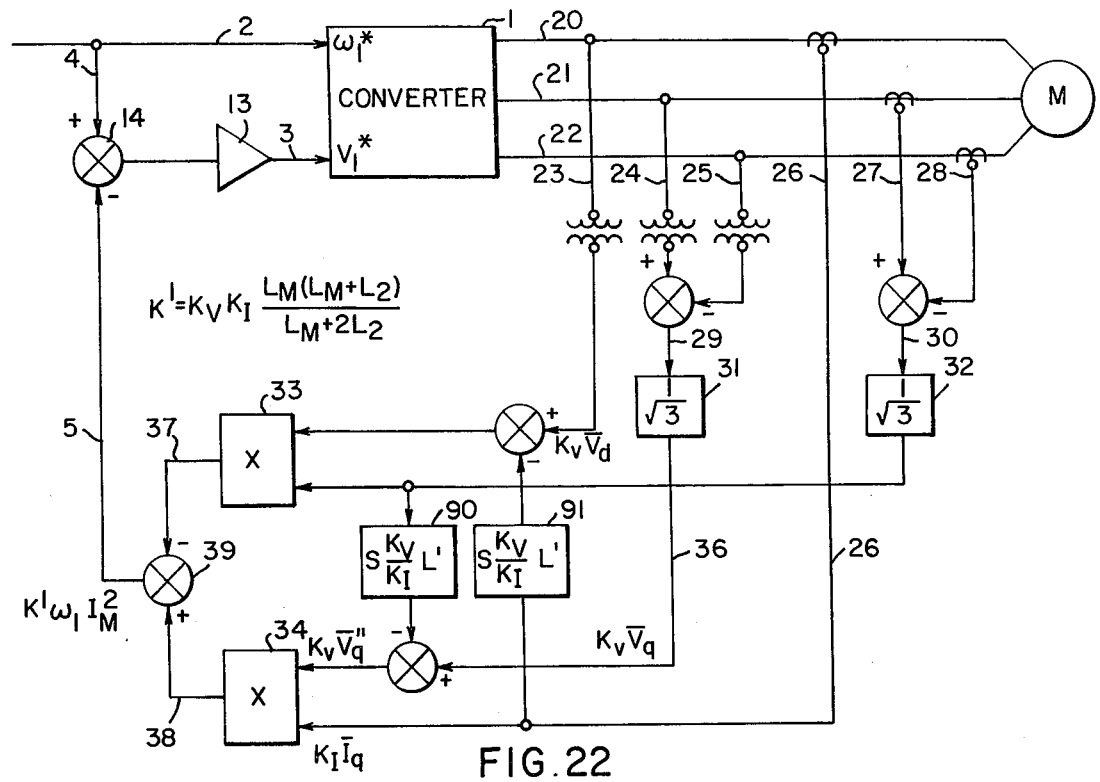
FIG. 22 is a control circuit according to the invention which is more specific than the control circuit of FIG. 14; and, FIG. 23 represents the preferred embodiment of the present invention.

A method similar to the one used to compute $W_X$ can be used for the computation of $W_X''$, using $\overline{V}_1''$ instead of $\overline{V}_1$, considering the fact that $\overline{V}_1'' = \overline{V}_1 - J\omega_1 L'\overline{I}_1$. Therefore, $K\omega_1 I_M^2$ may be obtained from sensing motor voltages and motor currents in a manner as shown on FIG. 20, provided a correction is effected between the inputs of each of the multipliers 33, 34, so that as can be seen by analogy from the equivalent circuit of FIG. 21. The implementation of this method is illustrated by FIG. 22. The same numeral references are used in FIG. 22 for the circuit elements which are the same as in FIG. 20. The compensating elements appear as 40, between lines 26 and 46 for $V_d''$, and as 41, between line 35 and 36 for $V_q''$. Each compensating circuit 40, 41 has a transfer function $s\ K_V/K_I\ L''$, where $s$ is the Laplace operator and $L' = L_1 + L_M L_2/L_M + 2L_2$, where $L_M$ and $L_2$ are the motor inductive constants as previously defined.

As a result, the output of summer 39, on line 5, provides a signal representing $K'\omega_1 I_M^2$ (where $K'$ is a constant proportional to $K$ as hereabove defined). This signal is used as the feedback signal to be compared with a reference signal which is proportional to $\omega_1$, as derived from line 4, and $V_1$ is controlled accordingly, as explained above by reference to FIG. 14.

DESCRIPTION OF THE PREFERRED EMBODIMENT

Figure 23:
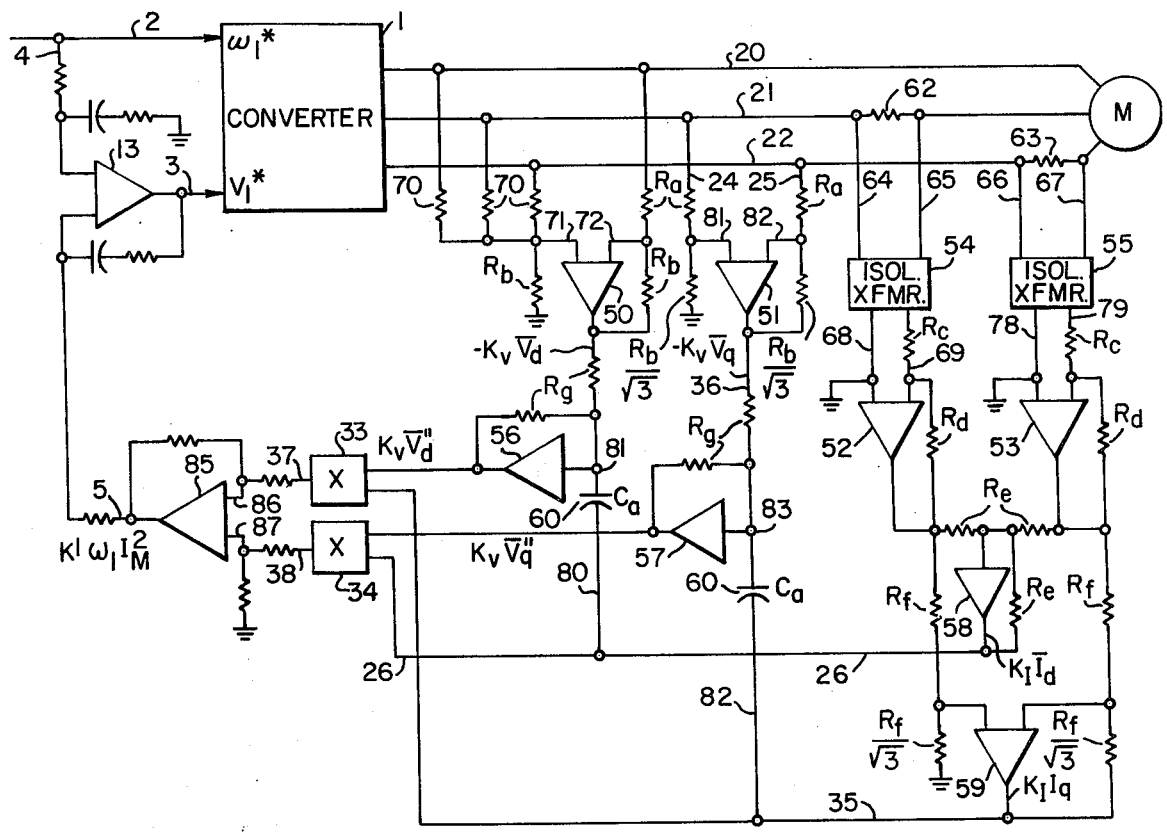

More specifically, the above synthesization methods can be implemented with analog circuits, one preferred embodiment being in accordance with a configuration described hereinafter by reference to FIG. 23.

The output lines 20, 21 and 22 of converter 1 are sensed to derive signals proportional to the voltages applied to the motor, and to the currents circulating in the stator windings thereof. Voltage sensing is accomplished through operational amplifiers 50 and 51. These are wired in a "full differential" amplifier configuration. A resistance value $R_a$ is used as the base resistance for the system. Thus, three identical resistors 70 are provided each of ohmic value 3 $R_a$, wired from each output line 20, 21, 22 to form an artificial neutral network connected to line 71, which is itself connected to the non-inverting input node of amplifier 50. A resistor of value $R_a$ is also connected between converter output line 20 and the second (inverting) input node of amplifier 50. Two identical resistors of value $R_b$ are also connected respectively between the inverting input node and the output of amplifier 50, and between the non-inverting input node and ground. Therefore, at the output of amplifier 50 an output signal $-k_v \overline{V}_d$ is derived which is proportional to the line-neutral voltage of line 20 selected as the phase of the direct component $\overline{V}_d$ of the voltages applied to the motor. The scale factor $k_v$ is a funtion only of $R_a$ and $R_b$, as indicated by the relation $k_v = R_b/R_a$. The actual values of resistors $R_a$ and $R_b$ depend on the motor voltage level, the characteristics of the operational amplifiers, the levels of the dc supply voltages used in the control circuits, among others. They can easily be given one of many possible values, among which a man skilled in the art of operational amplifiers can easily make the choice. In a typical example, $R_a = 300\ K\omega$ and $R_b = 10\ K\omega$. These values lead to a scale factor $k_v = 1/30$ volt per volt.

Similarly, an amplifier 51 is provided to generate a signal proportional to the difference between the voltages of the second and third converter output lines 21 and 22. From these two lines, two identical resistors of $$\overline{V}_d'' = \overline{V}_d - j\omega_1 \left( L_1 + \left(\frac{L_M L_2}{L_M + 2L_2}\right)\right) \overline{I}_d \text{ and } \overline{V}_q'' = \overline{V}_q - j\omega_1 \left( L_1 + \left(\frac{L_M L_2}{L_M + 2L_2}\right)\right) \overline{I}_q$$

value $R_a$ are connected to the two input nodes of amplifier 51. Two identical resistors of value $R_b/\sqrt{3}$ are also connected, one between the inverting node 82 and the output amplifier 51 and the other, between the non-inverting node 81 of amplifier 51 and ground. From the vectorial diagram of FIG. 18 relative to the orthogonal vector system $\overline{V}_d$, $\overline{V}_q$, into which the set of motor input voltages can be resolved, it appears that the output of amplifier 51 is a signal of the form $-k_v \overline{V}_q$, with a scale factor $k_v$ having the same value as for the output signal of amplifier 50.

The current sensing arrangement includes two identical shunt resistors 62 and 63, of value $R_s$ (typically 10 milliohm) inserted in series with the second and third converter output lines 21, 22. Isolation transducers 54 and 55 are provided and the small signals developed across the shunts 62, 63, are supplied to the control circuitry with ground as the reference voltage. The isolation transducers in the preferred embodiment have unity gain, although other gain values are possible in other instances. The transducer output signals are amplified through operational amplifiers 52 and 53 with a selected scale factor. The choice of scale factor $k_I$ depends upon the motor current levels and the voltage dynamic range of the processing analog circuitry. This scale factor $k_I$ (typically 0.1 volt per ampere) is fixed by the choice of the shunt value $R_s$ and of resistors $R_c$ and $R_d$ associated with amplifiers 52 and 53, the relation being: $k_I = R_s R_d/R_c$. Typically, $R_d = 100 \, K\omega$ and $R_c = 10 \, K\omega$. Reference may be had to FIGS. 16, 17, 18 and 19 and to equations (9) to (12).

At the outputs of amplifiers 52 and 53 two signals are generated respectively proportional to the currents in motor lines 21 and 22. From these signals, the two direct and quadrature components $\overline{I}_d$ and $\overline{I}_q$ of the motor currents are built up by circuitry as follows. First, the direct component $\overline{I}_d$ is obtained through amplifier 58, which performs the summation and inversion of the outputs of amplifiers 52 and 53. For this purpose, three identical resistors $R_e$ are used in conjunction with amplifier 58 (a typical vlaue is $10K\omega$), as shown in FIG. 23. Therefore, the output of amplifier 58 is the direct motor current component $k_I\overline{I}_d$ since the inverted sum in fact reconstructs the current signal in the first converter output line 20.

In order to obtain the quadrature component $\overline{I}_q$, a signal representing the difference between the outputs of amplifier 52 and 53 is derived from operational amplifier 59. The difference signal is used in conjunction with two pairs of identical resistors, $R_f$ and $R_f/\sqrt{3}$ so as to scale it down by a factor $\sqrt{3}$, as seen from equation (12). Typically, $R_f = 10 \, K\omega$. Thus, the output of amplifier 59 is the required quadrature component of the current $k_I\overline{I}_q$.

From the four voltage and current component signals so derived on lines 23, 36, 26 and 35, the current dependent correction of the voltage signals (already described by reference to FIG. 22 and blocks 40 and 41) is accomplished through operational amplifiers 56 and 57, with resistors of value $R_g$ (typically 10K) connected as input and feedback elements, and capacitors 60 of value $C_a$ as cross-coupling elements for the current and voltage signals. It can easily be seen that if the capacitor value is such that $R_g C_a = k_v/k_I(L_1 + L_M L_2/L_M + 2L_2)$ proper compensation is effected in agreement with the previously stated equations.

The corrected voltage signals and current signals are then applied to analog multipliers 33 and 34. The output signals thereof appear on lines 38 and 38. They are subtracted from each other through differential amplifiers 85. The difference signal, derived on line 5, is a feedback signal in the form $K' \omega_1 I_M^2$, thus the signal indicative of the flux level (where $K'$ is a constant proportional to K as hereabove defined).

At the input of differential amplifier 13, the feedback signal from line 5 is compared with a frequency-proportional reference signal derived from line 4. Such frequency-proportional signal actually is the frequency control signal applied through line 2 to the converter 1 for the purpose of regulating the speed and torque of the motor. As a result of such comparison an error signal is derived, which, after amplification via amplifier 13, is used to adjust the motor voltage so as to reduce the error as well known from general principles of negative feedback regulation.

To summarize, the present invention calls for flux control by a control signal obtained by synthesization from sensed motor input currents and motor input voltages. Such control signal is used to vary the voltage so as to set or maintain a desired flux level in the induction motor. Such synthesized signal can be used to operate a motor at a constant and optimum flux level. It can also be used to vary the flux conditions as desired in any particular instance.

In the specific form of the invention described therein, the synthesized signal derived after processing is in the form $K\omega_1 I_M^2$, and means have been described to derive from such signal a voltage control signal which is effective to keep $I_M$ = constant. It is understood that other means of control are possible using a synthesized signal in accordance with the present invention. For instance, when the synthesized signal represents $K\omega_1 I_M^2$, it is possible to insert a square root circuit to obtain $I_M$ instead of $I_M^2$. Also, a dividing circuit may be employed to eliminate $\omega_1$ as a factor in the expression of the function of the magnetizing current $I_M$, e.g., of the motor flux.

I claim:

1. A system for controlling the flux of an induction motor driven by a polyphase power supply of variable frequency and variable voltage through motor line terminals, the system comprising:
    means for sensing the motor input currents from said line terminals;
    means for sensing the motor terminal voltages from said line terminals;
    means responsive to said input current sensing means and to said terminal voltage sensing means for generating a synthesized signal representative of $W_X$ where $W_X$ is the motor phase reactive power; and
    means responsive to said synthesized signal for controlling the voltage of said power supply as a function of said reactive power.

2. The system of claim 1, wherein said synthesized signal represents a function of the square of the magnetizing current $I_M$ developed by the stator of said induction motor, with said contolling means including means for extracting the square root of said synthesized signal; whereby said controlling means is effective to control the voltage of said power supply as a function of the flux the motor.

3. The system of claim 1, wherein said synthesized signal represents a relation of proportionality to $\omega_1 I_M^2$, where $\omega_1$ is the frequency of the currents in said line terminals, with means being provided for deriving a reference signal proportional to said frequency and means being provided for comparing said synthesized signal with said reference signal, said voltage controlling means being responsive to said comparing means to adjust $I_M^2$ to a predetermined level when at least one of said frequency $\omega_1$ and the load of the motor is varied.

4. The system of claim 1 with said input current sensing means providing a signal representation of the amplitude current I common to said line terminal currents, said terminal voltage sensing means providing a signal representation of the amplitude V common to said line terminal voltages, with the provision of means for deriving a signal representation of the power factor $\phi$ of said line terminals, with $W_X = VI \sin \phi$.

5. The system of claim 1 with said synthesized signal generating means including means for separately deriving four signals representative of the direct current and voltage and of the quadrature current and voltage, respectively, $W_X$ being derived by subtracting two signals combining, respectively, the product of the direct voltage by the quadrature current and the product of the direct current by the quadrature voltage.

6. The system of claim 5 with said synthesized signal generating means including means responsive to said input current sensing means and to said terminal voltage sensing means for separately deriving signals representative of the direct current and voltage and of the quadrature current and voltage, first means for correcting the quadrature voltage signal as a function of the quadrature current signal to derive a corrected quadrature voltage signal, second means for correcting the direct voltage signal as a function of the direct current signal to derive a corrected direct voltage signal and means for subtracting the product of said quadrature current signal by said corrected direct voltage signal from the product of said direct current signal by said corrected quadrature voltage signal thereby to derive said synthesized signal.

7. The system of claim 6 wherein said first correcting means includes means responsive to said quadrature current signal for computing the transfer function $SK(L_1 + L_M L_2/L_M + 2L_2)$ and wherein said second correcting means includes means responsive to said direct current signal for computing the transfer function $SK(L_1 + L_M L_2/L_M + 2L_2)$ where K is a constant of proportionality, where S is the Laplaian operator, and where $L_1$, $L_2$ and $L_M$ are the motor inductive constants, $L_1$ for the stator, $L_2$ for the rotor and $L_M$ for the mutual.

8. The system of claim 3 with said comparing means being responsive to said reference signal proportional to $\omega_1$, and to said synthesized signal to derive an error signal;

with said voltage controlling means being responsive to said error signal to nullify said error signal, thereby to maintain $I_M^2$ substantially constant.

9. The system of claim 3 with square root means being provided for converting said synthesized signal into a signal proportional to $I_M$, feedback means being provided to control said voltage controlling means in relation to a magnetizing current reference signal.

10. The system of claim 3 with dividing means being provided for dividing said synthesized signal by said frequency $\omega_1$ to derive a signal proportional to $I_M^2$, and with square root means for converting said signal proportional to $I_M^2$ into a signal proportional to $I_M$, feedback means being provided to control said voltage controlling means in relation to a magnetizing current reference signal.

11. A method of meausring the flux of an induction motor driven by a polyphase power supply via motor line terminals, comprising the steps of:

sensing the motor input currents from said line terminals;

sensing the motor terminal voltages from said line terminals;

combining the sesned motor input currents and motor terminal voltages to compute a signal representation of $W_X$ where $W_X$ is the motor phase reactive power, thereby to derive an expression directly related to the square of the flux of the motor.

* * * * *